US010621685B2

(12) United States Patent
Bostick et al.

(10) Patent No.: US 10,621,685 B2
(45) Date of Patent: Apr. 14, 2020

(54) COGNITIVE EDUCATION ADVISOR

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 281 days.

(21) Appl. No.: 15/477,742

(22) Filed: Apr. 3, 2017

(65) Prior Publication Data

US 2018/0285997 A1 Oct. 4, 2018

(51) Int. Cl.
*G06Q 50/20* (2012.01)
*G09B 7/00* (2006.01)
*G09B 5/00* (2006.01)
*G09B 19/00* (2006.01)
*G09B 9/00* (2006.01)
*G06Q 10/10* (2012.01)
*G06N 20/00* (2019.01)
*G09B 7/04* (2006.01)

(52) U.S. Cl.
CPC .......... *G06Q 50/205* (2013.01); *G06N 20/00* (2019.01); *G06Q 10/10* (2013.01); *G09B 5/00* (2013.01); *G09B 7/00* (2013.01); *G09B 7/04* (2013.01); *G09B 9/00* (2013.01); *G09B 19/00* (2013.01)

(58) Field of Classification Search
CPC ...... G06N 20/00; G06Q 50/205; G06Q 10/10; G09B 19/00; G09B 5/00; G09B 7/04; G09B 9/00; G09B 7/00
See application file for complete search history.

(56) References Cited

U.S. PATENT DOCUMENTS

| 5,002,491 | A  | * | 3/1991 | Abrahamson | ............ | G09B 5/14 434/322 |
| 8,682,241 | B2 |   | 3/2014 | Huerta |   |   |
| 2011/0244953 | A1 | * | 10/2011 | Pekau | .................. | G06Q 10/101 463/29 |

(Continued)

FOREIGN PATENT DOCUMENTS

WO    2015127059 A2    8/2015

OTHER PUBLICATIONS

Mell, Peter, et al., "The NIST Definition of Cloud Computing", NIST Special Publication 800-145, Sep. 2011, Gaithersburg, MD, 7 pgs.

*Primary Examiner* — Xuan M Thai
*Assistant Examiner* — Malina D. Blaise
(74) *Attorney, Agent, or Firm* — James Nock, Esq.; George S. Blasiak, Esq.; Heslin Rothenberg Farley & Mesiti P.C.

(57) ABSTRACT

Methods, computer program products, and systems are presented. The methods include, for instance: obtaining real time data from an individual device on person of a student attending a class, identifying activities from the real time data and correlating to respective impacts to performance, quantifying the respective impacts and predicting the performance of the student. Further recommendation may be generated and communicated in cases where the predicted performance is below threshold for the class.

20 Claims, 5 Drawing Sheets

(56) References Cited

U.S. PATENT DOCUMENTS

| | | | |
|---|---|---|---|
| 2013/0124234 A1* | 5/2013 | Nilsson | G06Q 30/02 |
| | | | 705/5 |
| 2013/0226674 A1* | 8/2013 | Field | G06Q 50/20 |
| | | | 705/7.38 |
| 2013/0234826 A1* | 9/2013 | Sekiguchi | H04N 21/42201 |
| | | | 340/5.53 |
| 2014/0009496 A1* | 1/2014 | Chapman | G06Q 10/06 |
| | | | 345/636 |
| 2014/0170626 A1 | 6/2014 | Lovett et al. | |
| 2014/0272896 A1 | 9/2014 | Malik et al. | |
| 2014/0342341 A1* | 11/2014 | Rea | G09B 7/02 |
| | | | 434/351 |
| 2015/0050637 A1 | 2/2015 | James-Hatter et al. | |
| 2015/0148923 A1 | 5/2015 | Grimme et al. | |
| 2015/0206441 A1* | 7/2015 | Brown | G09B 5/00 |
| | | | 434/308 |
| 2016/0148109 A1 | 5/2016 | Watanabe et al. | |
| 2016/0189563 A1* | 6/2016 | Fried | G09B 19/00 |
| | | | 434/236 |
| 2016/0294775 A1* | 10/2016 | Mahadik | H04L 63/0236 |
| 2017/0268793 A1* | 9/2017 | Cardonha | G06K 9/00711 |
| 2017/0372551 A1* | 12/2017 | Bruce | G07C 9/00571 |
| 2018/0218259 A1* | 8/2018 | Braz | G06N 5/043 |
| 2018/0285791 A1* | 10/2018 | Ashikhmin | G06Q 10/0631 |

\* cited by examiner

COGNITIVE EDUCATION ADVISOR

TECHNICAL FIELD

The present disclosure relates to cognitive analysis, and more particularly to methods, computer program products, and systems for predicting educational performance based on real time input data during class and past performance record.

BACKGROUND

In conventional educational environment, additional to classes in traditional classroom lessons, various assistances to students may be provided via online sites in sharing class material and in establishing communication channel between parents and teachers. In cases of online classes, attendance and assignments/tests are checked and performed online. As more types of mobile devices with numerous functionalities become available, more real time data may be utilized in providing more comprehensive education assistance services.

SUMMARY

The shortcomings of the prior art are overcome, and additional advantages are provided, through the provision, in one aspect, of a method. The method for providing cognitive education advisory services includes, for example: obtaining, by one or more processor, real time data including individual data from an individual device on person of a student attending a class, the individual device corresponding to the student; identifying one or more activity from the real time data; correlating each of the one or more activity with respective impact to performance of the student based on performance record of the student; calculating respective activity impact scores corresponding to the respective impacts of each of the one or more activity to performance of the student; predicting the performance of the student by adding up the activity impact scores; generating one or more recommendation in order to improve the performance of the student, responsive to determining that the predicted performance is below a preconfigured threshold for the class; and communicating the one or more recommendation to a group of recipient specified for the student.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
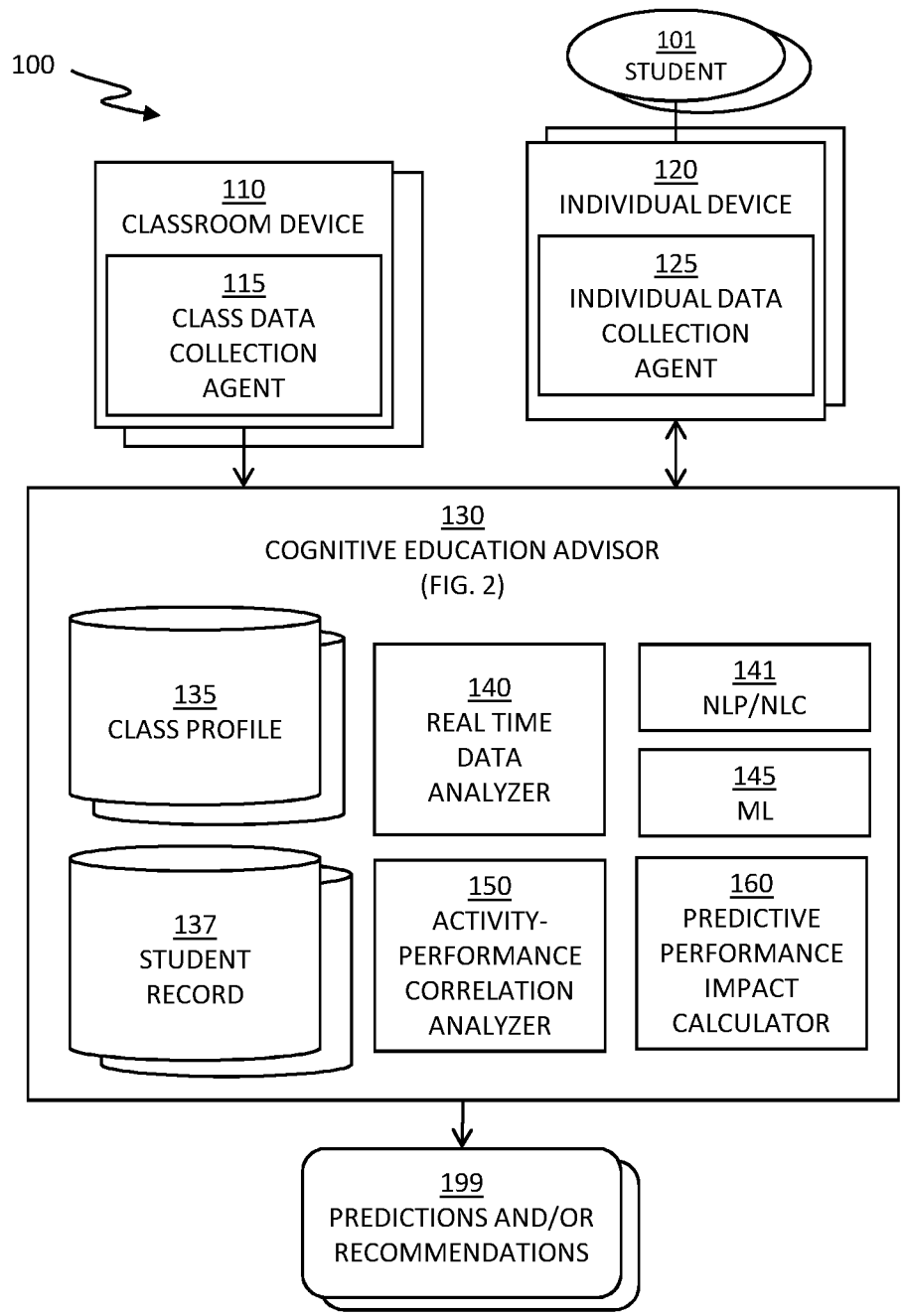
FIG. 1 depicts a system for providing cognitive education advisory services, in accordance with one or more embodiments set forth herein.

FIG. 1 depicts a system 100 for providing cognitive education advisory services, in accordance with one or more embodiments set forth herein.

The system 100 providing cognitive education advisory services includes one or more student, respectively carrying one or more individual device, one or more classroom device, and a cognitive education advisor 130. A student 101 of the one or more student carries an individual device 120 of the one or more individual device communicating with the cognitive education advisor 130. The individual device 120 runs an individual data collection agent 125 that collects individual data on the student 101 and sends the collected individual data to the cognitive education advisor 130.

The student 101 is attending a class at a location equipped with one or more classroom device 110. The cognitive education advisor 130 receives class data as collected by a class data collection agent 115 running on the classroom device 110. The cognitive education advisor 130 may communicate with multiple groups of classroom devices, respectively corresponding to each physical classroom.

The classroom device 110 indicates a device installed in a physical classroom to gather class data from the physical classroom. The term "class data" indicates the data common to collective members in the class, including all of the students attending the class as well as one or more instructor teaching the class. Examples of the classroom device 110 may include, but are not limited to, one or more camera, one or more microphone, micro-location stations, etc. The classroom device 110 may be static as physically attached to the physical classroom, as opposed to the individual device 110 on the student 101 that is typically mobile. In certain embodiments of the present invention, the class may be held online and no classroom device may be present. In the same embodiment, the classroom data may be obtained by aggregating individual data from all individual devices of all participants, provided that individual devices capture video and/or audio data. Each classroom device 110 runs a class data collection agent 115 that collects class data captured by the classroom device 110 and sends the class data to the cognitive education advisor 130. Examples of the class data may include, but are not limited to, video capture of the class during session, audio recording of the class, etc. The cognitive education advisor 130 utilizes the class data in combination with the individual data in generating predictions and recommendations 199 in order to improve performance of the class, individually for students and collectively for the class, as well as performance of the teacher. In this specification, the term "performance" indicates scholastic performance wherein used with respect to a student. The term "performance" also may indicate occupational performance wherein used with respect to a teacher.

The individual device 110 may be any type of mobile and/or wearable device on the student 101, having equipped with geolocation and/or micro-location functionalities, a microphone, a movement sensor, a vibrating motor, optionally biometric identification functionalities, and data capturing, processing, and communicating capabilities, etc., and combinations thereof. Examples of the individual device 110 may be, but are not limited to, a smart watch, a smart phone, a tablet, a laptop, etc. The geolocation and/or micro-location functionalities of the individual device 110 facilitates the cognitive education advisor 130 with information on the student 101 as to whether or not the student 101 is attending classes as scheduled, as to in which position in the classroom the student 101 is seating, etc. The microphone of the individual device 120 facilitates the cognitive education advisor 130 with information on the student 101 as to how much the student 101 talks during class on which topic, which may be classified into participation, disruption, etc. Examples of participatory speech may include asking questions, discussing the subject/topic of the class with classmates, responding to a question from the teacher, etc.

The cognitive education advisor 130 includes, otherwise has access to, one or more class profile respectively corresponding to each class, one or more student record respectively corresponding to each student, a real time data analyzer 140, a natural language processing and natural language classifying utility (NLP/NLC) 141, a machine learning process 145, an activity-performance correlation analyzer 150, and a predictive performance impact calculator 160. All functional components of the cognitive education advisor 130 presented herein may or may not be implemented as distinctive processes and/or data repositories. Detailed operations of the cognitive education advisor 130 are presented in FIG. 2 and corresponding description.

A class profile 135 of the one or more class profile corresponds to the class. The class profile 135 includes information on the physical classroom in which the class is held such as a seating chart of the physical classroom, a schedule and subject of the class, a roster listing students registered to attend the class and one or more instructor teaching the class, interfaces to access student records respective to students listed in the roster, real time mapping of the seating chart as occupied by each student during the class, etc.

A student record 137 of the one or more student record corresponds to the student 101. The student record 137 includes a student profile indicating basic personal information of the student 101 including biometric identification data, the individual device 120 of the student 101, and classes the student 101 is currently registered and respective grade thresholds for each class, as well as past classes that the student 101 had attended in the past. The student record 137 also includes a performance record of the student 101. The performance record of the student record 137 includes all scores of the student 101 from quizzes, tests, papers, homework assignments, and any other class activities being evaluated, respective to each class the student 101 attends currently as well as attended in the past, etc. The student record 137 further includes participation record of the student 101 respective to each class, based on the individual data of the student 101 as collected and sent from the individual device 120 as well as the classroom device 110. The participation record of the student 101 is initialized with past participation history and would be updated with the individual data and the class data in real time during the class in session.

The real time data analyzer 140 of the cognitive education advisor 130 takes the class data and the individual data input from the classroom device 110 and the individual device 120, respectively, in real time. In this specification, the term "real time data" is used to collectively indicate the class data and the individual data as collected in real time during the class. The real time data analyzer 140 differentiates input data into one of types including student biometric data, student location data, audio data from the class data, audio data from the individual data, visual data from the class data, visual data from the individual data, movement sensor input from the individual data, and analyzes respective data accordingly. The student biometric data may be compared against the biometric identification data of the student profile in order to identify the student 101 and to check the attendance. The student location data may be analyzed for a seating chart mapping of the student 101 in the class, in relation with seating chart mappings of classmates in the class. The audio data of the class data may be analyzed for a general noise level in the classroom and for content of speech, and visual data of the class data may be analyzed for general attentiveness of all students during the class. The audio data of the individual data may be analyzed for content of the speech by the student 101, which may be classified into various aspects depending on the topic and manner of the speech. The movement sensor input of the individual data are analyzed for participation as inferred from a movement of raising a hand, or by a movement on the wrist for note taking, etc.

The activity-performance correlation analyzer 150 of the cognitive education advisor 130 examines how activity data in the past, as stored in the participation record, had affected the performance record of the student 101, and determines a relationship between activities of the student 101 with performances, as represented by the grades in the performance record of the student 101.

The predictive performance impact calculator 160 of the cognitive education advisor 130 quantifies how much impact each activity might have on the performance of the student 101, by calculating respective activity impact scores for each activity.

Wherein external utility services are readily available, particularly for speech analysis, the cognitive education advisor 130 may utilize external services of the NLP/NLC 141 such that the content of speech is properly structured, processed and classified. Accordingly, the class subject may be determined by use of audio analysis from the class data and/or the individual data. In cases where the topic of the speech by the student 101 is directed to educational purposes of the class and/or relevant to the subject of the class, the speech by the student 101 may be accounted as a participatory speech, which is predicted as a positive impact on the performance. Also, the machine learning 145, may be utilized to improve accuracies in correlating activity and impact to performance as well as effectiveness of the predictions and recommendations made, based on that the empirical data correlating activities with respective impact to performances cumulate over time.

Figure 2:
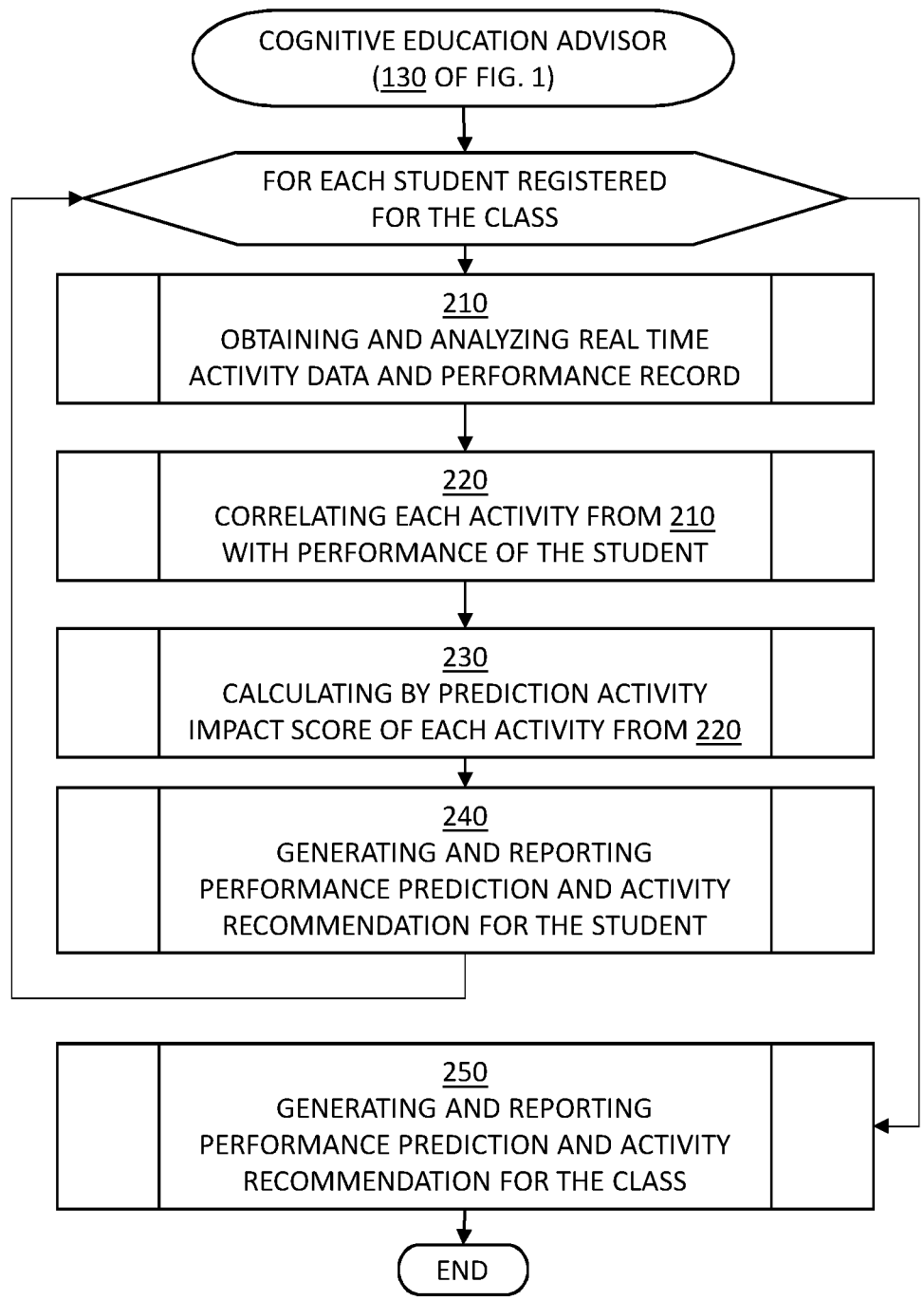
FIG. 2 depicts a flowchart performed by the cognitive education advisor, in accordance with one or more embodiments set forth herein.

FIG. 2 depicts a flowchart performed by the cognitive education advisor 130 of FIG. 1, in accordance with one or more embodiments set forth herein.

Prior to block 210, the individual device 120 is registered for the student 101 in the student profile of the student record 137 such that the individual data captured by the individual device 120 may be identified with the student 101. In certain embodiments of the present invention, certain types of the individual device 120 may be equipped to detect whether or not the student 101 registered with the individual device 120 is actually present in the class with the individual device 120 such that the attendance record may be more accurate and independently verifiable without using the classroom data for identifying the student 101 by use of facial recognition and/or other identification mechanisms. The student profile of the student record 137 for the student 101 may be configured with respective grade thresholds for each class, in order to determine whether or not to make predictions and/or recommendations for a certain class for a given grade. For example, the student profile of the student 101 may have grade thresholds of average point B for Math, average point A for History and English, and average point C for Art.

In one embodiment of the present invention, the cognitive education advisor 130 performs blocks 210 through 240 for each student in the class, then the cognitive education advisor 130 proceeds with block 250 for the class. The cognitive education advisor 130 may perform blocks 210 through 250 as a unit for each class subject to the advisory service as provided by the cognitive education advisor 130.

In block 210, the cognitive education advisor 130 obtains real time activity data as well as the performance record of the student 101, for all attending students. The real time activity data collectively indicate the individual data and the class data collected from the individual devices and the classroom device, respectively, during the class in real time. Wherein the classroom device is not present as in online education, the class data may be an aggregation of the individual data for all attending students. Then the cognitive education advisor 130 proceeds with block 220.

In certain embodiments of the present invention, the individual data include location data, individual audio data, movement data, and optional biometric data. The activity data include the location data as captured by geolocation and/or micro-location component on the individual device, which are used to determine seating chart mapping data of the student 101 with a date/time stamp. The location data of the student 101 is utilized to determine if the student 101 attends the class, of which result is recorded as attendance data. The activity data include the individual audio data as captured by a microphone on the individual device, which are used to determine auditory participation with the class such as asking questions, discussing the class subject, etc. The activity data also include the movement data as captured by a movement sensor on the individual device, respectively along with a date/time/location stamp, which are used to determine a participation level of the student to the class by raising a hand, or to determine attentiveness with the progress by a movement on the wrist for note taking, etc. The activity data may optionally include biometric identification data if the individual data is equipped with a biometric identification functionalities such as a fingerprint scanner, etc., in order to guarantee the accuracy of the attendance of the student 101 by identifying the student 101 who is carrying the individual device to the class as a student who is registered with the individual device in the student profile.

In certain embodiments of the present invention applied for online classes, the real time activity data may include conversation script data gathered via dialog interfaces by which the student 101 may submit questions and discuss the subject amongst classmates and/or with an instructor. The conversation script data would be used to determine the participation level as well as the attentiveness of the student, similarly with the movement data and/or the individual audio data in a traditional classroom environment.

The performance record of the student may be retrieved from the student record 137, including all scores of the student 101 from all scored activities of the class such as quizzes, tests, papers, homework assignments, etc. In certain embodiments of the present invention, the performance record of the student is made available to authorized users such as parents and teaching staffs, for review and information purposes.

In block 220, the cognitive education advisor 130 determines a relationship between activities of the student 101 with performances by analyzing correlations between respective activities identified from block 210 and the respective impact to performance of the student. In certain embodiments of the present invention, the cognitive education advisor 130 may classify the activities into groups having previously known general relationships to the performance, such as positive and negative. Then the cognitive education advisor 130 proceeds with block 230.

For example with respect to the location data, the cognitive education advisor 130 correlates the location data from the individual data of the student with the schedule, the seating chart, and the roster of the class profile, to determine whether or not the student attends the registered class, according to a premise that attending classes is fundamentally positively correlated to good grades and that absenteeism is negatively correlated to good grades. The cognitive education advisor 130 may further correlate the same location data, the same class profile data, to determine where in the classroom the student seats, according to another premise that seating in the front of the classroom is more positively correlated to good grades than seating in the back of the classroom. The cognitive education advisor 130 may further correlate the same location data, the same class profile data, and individual location data from other students in the class to determine classmates surrounding the student and to determine a peer influence on performance of the student, according to still another premise that exemplary activities of surrounding students during the class positively affects the performance of the student and that disruptive activities of surrounding students negatively affects the performance of the student. The cognitive education advisor 130 may determine a pattern of behavior for respective students, or a group of students, from repeated activities by the students and correlate the patterns of behavior to the performance of the student, for the students or the group of students who seat in proximity of the student. Proximity of students may be determined based on respective location data of the students, designated seats in the classroom, and/or voice/face recognition facial based on audio/visual data analysis of the class data. The pattern of behavior of the students/groups may be assigned to one of classifications including helpful or disruptive, and positive, neutral, or negative, etc.

For another example with respect to the movement data, the cognitive education advisor 130 detects the movement data from certain individual devices for the student and individual audio data with respective participatory activities such as raising a hand, asking and responding to questions, etc. The cognitive education advisor 130 may keep the record on frequencies of respective activities and compare the record with the grades. Also the cognitive education advisor 130 may classify the content of speech according to various categories such as the subject of the class, particular topics of the speech, questions to the teacher, peer discussions, and responses to questions from the teacher, etc.

In the same example with respect to the participatory activities and corresponding frequencies, the cognitive education advisor 130 may further analyze the real time activity data to infer the reasons of the student engaged in a particular participatory activity, or lack thereof. For example, a student who did not ask any questions fails a quiz on a certain topic as detected by the movement data, the cognitive education advisor 130 may analyze respective individual audio data of the student and surrounding students, to discover any issues that may have caused the student not to ask the question such as inattentiveness on the student, disruption from the surrounding students, etc.

For another example with respect to the video data from the class data, the cognitive education advisor 130 may correlate a certain visual image pattern in the classroom with a level of order in the classroom. The cognitive education advisor 130 may correlate, for example, students walking around in the classroom with a disorderly the classroom and use the correlation in order to evaluate the collective attentiveness/performance of the class and/or the teacher. Further, the cognitive education advisor 130 may use the video data from the class data, where applicable, in order to detect individual attentiveness of the student. Similarly, the cognitive education advisor 130 may utilized the audio data from the class data, to correlate a certain pattern of sounds with the level of order in the classroom. For example, the cognitive education advisor 130 may correlate a level of noise louder than normal speech, extended ineligible speech caused by many students talking simultaneously, etc., with the same lack of order in the classroom and poor performance of the students as a class, or by the teacher. The cognitive education advisor 130 may evaluate the correlations based on grades of the students, from the same class as well as from the comparable other classes.

In block 230, the cognitive education advisor 130 calculates activity impact scores respective to each activity that had been correlated to the performance of the student in block 220, by use of a predictive modeling. Then the cognitive education advisor 130 proceeds with block 240.

In certain embodiments of the present invention, by use of predictive modeling, the cognitive education advisor 130 assigns respective activity impact scores to each activity, based on that certain activities indicate common attributes of the student that would perform positively in the class. If the student demonstrates activities deviating from the indicative attributes for positive performances, the cognitive education advisor 130 would detect and notify such deviation as well as inform the student aware of corrective actions leading to the positive performances.

In certain embodiments of the present invention, the cognitive education advisor 130 calculates a collective activity impact score by adding all element scores based on the configuration including: Attendance=[1 if the student is present|0 if the student is absent]; Seating position=[1 if the student seats in the front of the classroom|0 if the student seats in the back of the classroom]; Peer influence=[1 if the student is attentive and helpful to nearby students|0 if the student is neither attentive nor disruptive|(−1) if the student is disruptive to other students in the class]; Raising a hand during session=[1 if the student raised a hand|0 if the student did not raise a hand]; Classroom audio/video=[1 if the student is attentive and/or participating|0 if the student is inattentive]; and Online questions=[1 if the student submitted a question|0 if the student did not submit any question], etc.

In certain embodiments of the present invention, the cognitive education advisor 130 calculates an activity impact score by adding all weighted element scores based on the configuration as above, wherein the cognitive education advisor 130 determines the respective weight applicable to each element score based on past activity-performance correlations of the student, cumulated correlation for all students of the same grade, etc.

In block 240, the cognitive education advisor 130 generates performance prediction based on the activity impact score corresponding to current activities of the student and recommendations for future activities conducive to good grades. The cognitive education advisor 130 subsequently reports the performance prediction and the recommendations to the student and/or recipient designated for the report such as parents or guardian, etc. If the cognitive education advisor 130 has any student left unreported with respective predictions and recommendations, then the cognitive education advisor 130 loops back to block 210 for a next student. If the cognitive education advisor 130 had reported for all students of the class, then the cognitive education advisor 130 proceeds with block 250.

In certain embodiments of the present invention, the cognitive education advisor 130 compares a grade threshold of a class with an actual grade of the student received. If the cognitive education advisor 130 determines that the actual grade of the student is equal to or higher than the grade threshold of the class, then the cognitive education advisor 130 may not made any predictions and recommendations. If the cognitive education advisor 130 determines that the actual grade of the student is lower than the grade threshold of the class, then the cognitive education advisor 130 may generate a report including past activities of the student and corresponding activity impact scores, which resulted in the actual grade being below the grade threshold for the class, and recommended activities of the student in order to improve the actual grade in a timely manner. The cognitive education advisor 130 may subsequently send the report to one or more designated recipient, or otherwise make available for access. Examples of the designated recipient may include, but are not limited to, the student, parents, teachers, counselors of the student, etc. The cognitive education advisor 130, in cases where real time stimuli is enabled, may send the real time stimuli that encourage the student to engage in activities strongly correlated to good grades, to the student via the individual device. Examples of the real time stimuli may include, but are not limited to, text messages or other notices directing activities to a cell phone registered as the individual device for a student present in the classroom in session, vibration or tactile pulsing on a smartwatch that is registered as the individual device for the student during class, etc. Examples of encouraged activities to improve grades may include, but are not limited to, in-session activities such as seating in the front of the classroom, participating in discussions during the class, asking questions, as well as numerous out-of-classroom activities such as coming to the class on time for attendance, timely submitting assignments, preparing for each class beforehand, reviewing each class afterward, studying for quizzes, tests, and exams, etc.

In block 250, the cognitive education advisor 130 generates performance prediction for the class by aggregating performance predictions of all students in the class and recommendations to improve performance of the class if the predicted performance for the class is below average or other applicable threshold for the class. For example, if more than ten percent (10%) of the students in the class are regularly inattentive and mostly disruptive, although only five percent (5%) of the students show similar behavior in other classes comparable in the age of students and class size, difficulty of the subject, etc., the cognitive education advisor 130 may generate a prediction for the class that the average performance of all students in the class may be less than satisfactory, analyze various class data and individual data to discover the cause of the predicted poor performance, and make recommendations to improve class performance according to respective causes, such as, by adding a teacher's assistant if the class is overcrowded, by utilizing more interactive teaching materials and methods if the class is too passive and inactive, by cutting down noises around the classroom in session if the class is right next to a construction site of a new school annex, by reevaluating and/or retraining the teacher for better skill and command of the class if the teacher does not properly control the students, etc. Then the cognitive education advisor 130 may terminate processing for the class. In cases where the cognitive education advisor 130 has more than one class to process, the cognitive education advisor 130 may proceed with a next class and loop back to block 210.

Certain embodiments of the present invention may offer various technical computing advantages, including automated predictions on class and/or individual performance and recommendations to improve the class and/or individual performance based on class activities as observed from various devices in the classroom and on the person of a student. Various types of real time data including biometric identification data, geolocation data, movement sensor input, and audio/video data are utilized to determine real time status and activities of the student during class, in a range of verifiable attendance, seating position in the classroom, participation and attentiveness during class. Audio data would be analyzed by use of various natural language processing and classification utilities in order to determine content of the speech. The activity data are correlated to performance by cognitive analysis of past activities and past performance records. Based on the real time data and the correlation, future performance is predicted according to the activities represented in the real time data, and compared against a preconfigured threshold. Notification of predicted performance below the threshold and recommendations to improve the performance would be provided to predefined recipients. The students may receive real time notifications as negatively correlated activities are performed in the class for immediate correction. The cognitive education advisory service may be implemented by use of a cloud platform, a data center, etc., and provided to schools and/or online learning centers on a subscription basis. Certain embodiments of the present invention improves the accuracy of the correlation between the activities and the performances that leading to accuracy of the predictions on the performances by use of machine learning. Accordingly, certain embodiments of the present invention improves the performance of individual students as well as collective performance of a class based on accurate evaluations of activities and impact of the activities on the performance.

Figure 3:
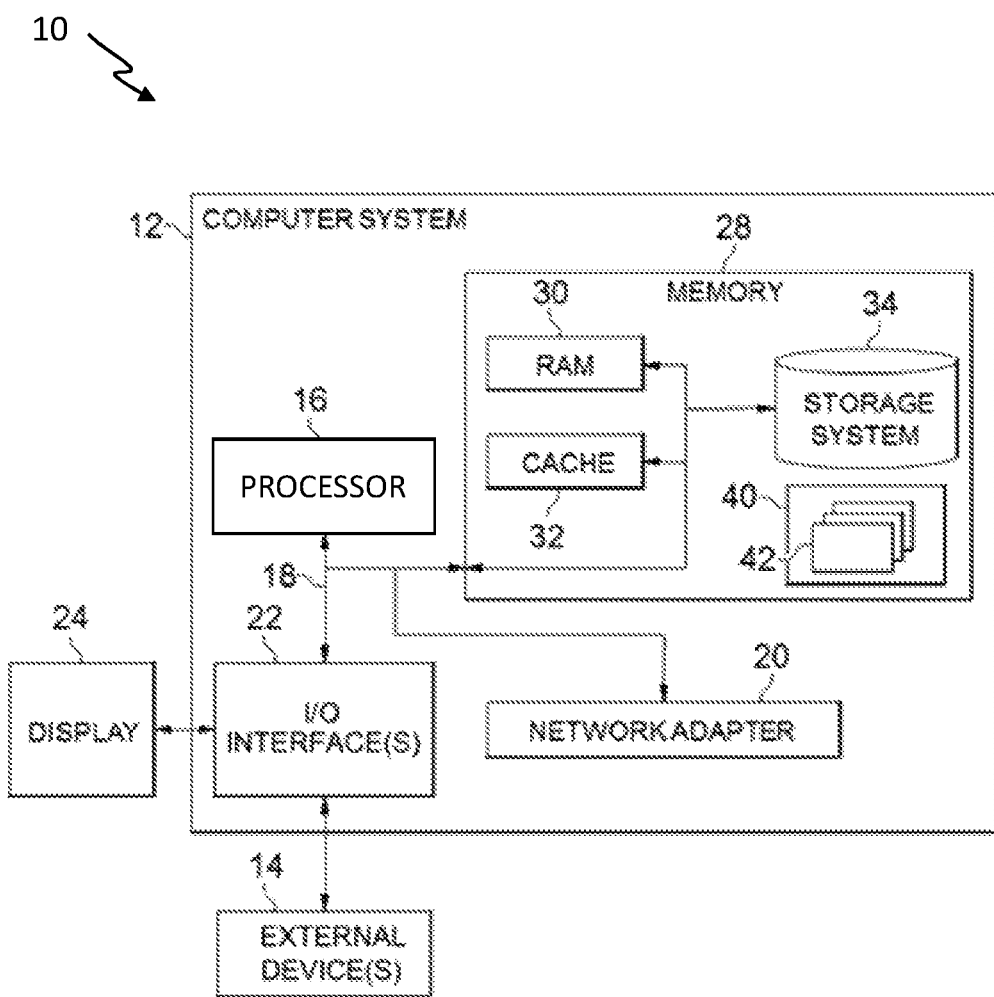
FIG. 3 depicts a cloud computing node according to an embodiment of the present invention.
Figure 4:
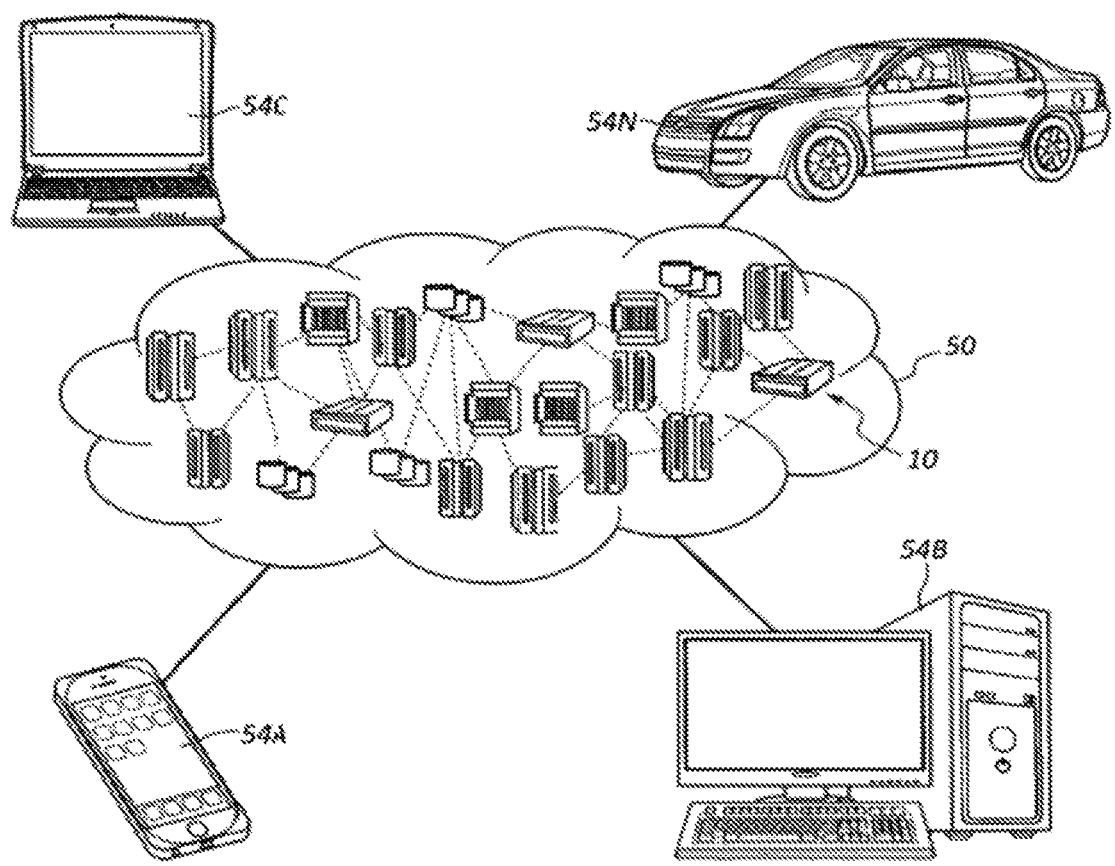
FIG. 4 depicts a cloud computing environment according to an embodiment of the present invention.
Figure 5:
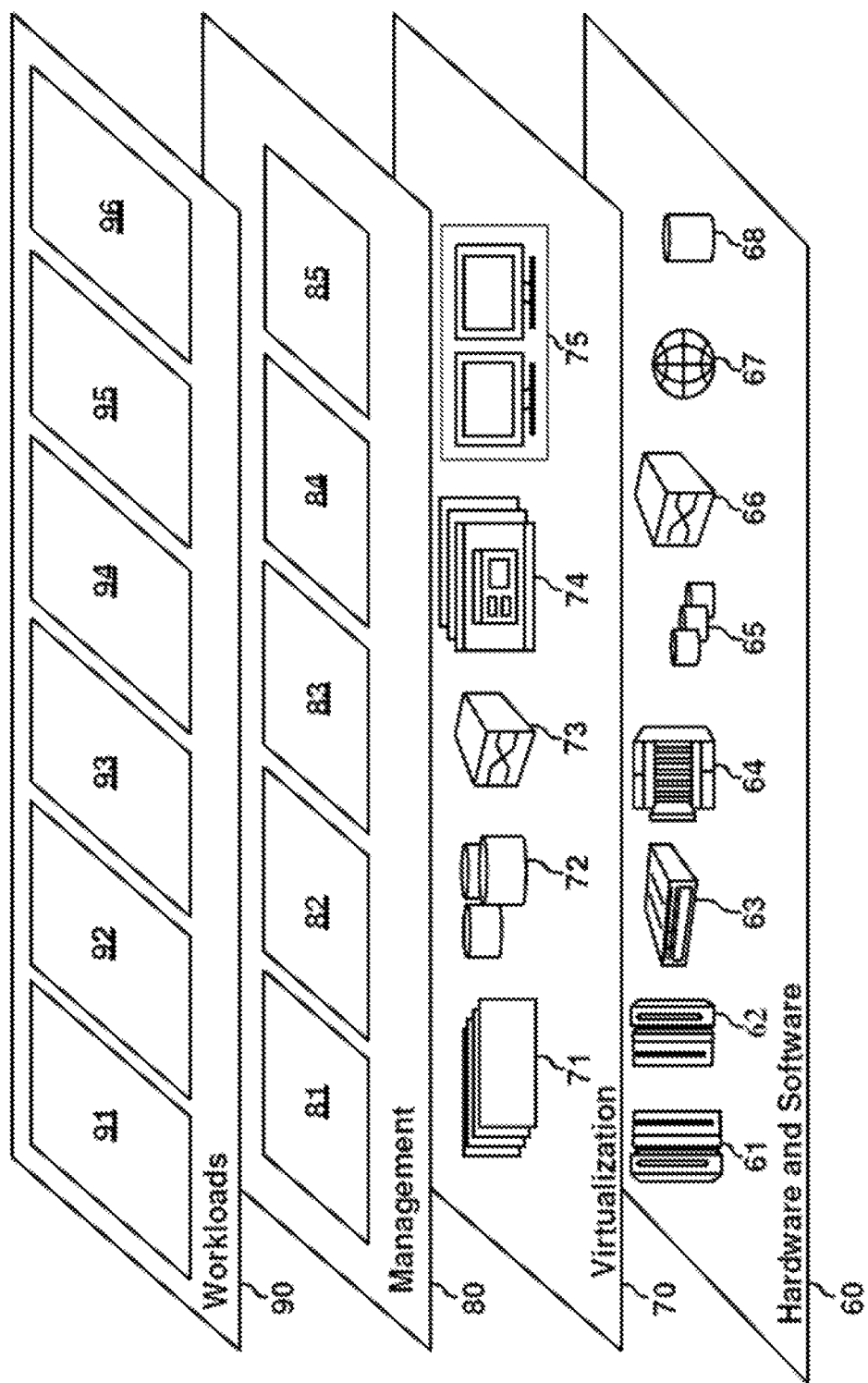
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive education advisor 130 of FIG. 1. Program processes 42, as in the cognitive education advisor 130 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive education advisor 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for providing cognitive education advisory services, comprising:

obtaining, by one or more processor of a cognitive education advisor, real time data including individual data from an individual device on person of a student attending a class, by an individual data collection agent running on the individual device, wherein the individual data collection agent communicates with the cognitive education advisor in real time, and wherein the individual device corresponding to the student is registered for the student in a student record for the student;

identifying one or more activity of the student during the class from the real time data, based on a configuration for the cognitive education advisor specifying the one or more activities;

correlating each of the one or more activity from the identifying with respective impact to performance of the student based on a performance record of the student record for the student, based on the configuration;

calculating respective activity impact scores corresponding to the respective impacts, by use of predictive modeling on attributes of each of the one or more activity to the performance of the student;

predicting the performance of the student in the class based on a collective activity impact score of the student in the class by adding up the respective activity impact scores from the calculating;

generating one or more recommendation in order to improve the performance of the student, responsive to determining that predicted performance from the predicting is below a preconfigured threshold for the class; and communicating the one or more recommendation to a group of recipients specified for the student, wherein the method comprises analyzing geolocation data of the individual data in order to classify a seating position of the student in a classroom, wherein the seating position may be instantiated with a value selected from the group consisting of Front and Back, indicating respective areas within the classroom; and determining the seating position having a Front value as a positive activity and determining the seating position having a Back value as a negative activity, wherein the method comprises comparing the seating position of the student in comparison with a second seating position of a second student in proximity of the student and discovering that an activity impact score for a peer influence attribute of the second student is less than zero (0), wherein a value of the peer influence attribute is selected from the group consisting of one, zero, negative one (1, 0, −1), wherein one (1) indicates that the second student is helpful to nearby students and attentive, zero (0) indicates that the second student is neutral, and negative one (−1) indicates that the second student is disruptive to the class.

2. The computer implemented method of claim 1, the generating comprising:
rendering a recommendation not to take a seat near the second student, responsive to determining that the predicted performance is below the preconfigured threshold for the class, wherein the one or more recommendation from the generating includes the recommendation.

3. The computer implemented method of claim 1, the generating comprising:
rendering a recommendation not to take a seat near the second student.

4. The computer implemented method of claim 1, further comprising:
analyzing audio data of the real time data for content in order to classify a speech represented by the audio data into respective topics.

5. The computer implemented method of claim 1, further comprising:
analyzing audio data of the real time data for content in order to classify a speech represented by the audio data into respective topics; and
determining the speech having a topic relevant to a subject of the class as a positive activity and determining the speech having a topic irrelevant to the subject as a negative activity.

6. The computer implemented method of claim 1, further comprising:
analyzing the real time data including audio data and movement data of the student in order to determine whether or not the student participates in the class, wherein participatory activities include raising a hand and asking questions; and
discovering that the student does not participate in the class from the analyzing.

7. The computer implemented method of claim 6, the generating comprising:
rendering a recommendation to participate in the class by performing one or more of the participatory activities, responsive to determining that the predicted performance is below the preconfigured threshold for the class, wherein the one or more recommendation from the generating includes the recommendation.

8. A computer program product comprising:
a computer readable storage medium readable by one or more processor and storing instructions for execution by the one or more processor for performing a method for providing cognitive education advisory services, comprising:
obtaining real time data including individual data from an individual device on person of a student attending a class, by an individual data collection agent running on the individual device, wherein the individual data collection agent communicates with a cognitive education advisor in real time, and wherein the individual device corresponding to the student is registered for the student in a student record for the student;
identifying one or more activity of the student during the class from the real time data, based on a configuration for the cognitive education advisor specifying the one or more activities;
correlating each of the one or more activity from the identifying with respective impact to performance of the student based on a performance record of the student record for the student, based on the configuration;
calculating respective activity impact scores corresponding to the respective impacts, by use of predictive modeling on attributes of each of the one or more activity to the performance of the student;
predicting the performance of the student in the class based on a collective activity impact score of the student in the class by adding up the respective activity impact scores from the calculating;
generating one or more recommendation in order to improve the performance of the student, responsive to determining that predicted performance from the predicting is below a preconfigured threshold for the class; and
communicating the one or more recommendation to a group of recipients specified for the student, wherein the method comprises analyzing geolocation data of the individual data in order to classify a seating position of the student in a classroom, wherein the seating position may be instantiated with a value selected from the group consisting of Front and Back, indicating respective areas within the classroom; and determining the seating position having a Front value as a positive activity and determining the seating position having a Back value as a negative activity, wherein the method comprises comparing the seating position of the student in comparison with a second seating position of a second student in proximity of the student; and discovering that an activity impact score for a peer influence attribute of the second student is less than zero (0), wherein a value of the peer influence attribute is selected from the group consisting of one, zero, negative one (1, 0, −1), wherein one (1) indicates that the second student is helpful to nearby students and attentive, zero (0) indicates that the second student is neutral, and negative one (−1) indicates that the second student is disruptive to the class.

9. The computer program product of claim 8, the generating comprising:
rendering a recommendation not to take a seat near the second student, responsive to determining that the predicted performance is below the preconfigured threshold for the class, wherein the one or more recommendation from the generating includes the recommendation.

10. The computer program product of claim 8, the generating comprising:
rendering a recommendation not to take a seat near the second student.

11. The computer program product of claim 8, further comprising:
analyzing audio data of the real time data for content in order to classify a speech represented by the audio data into respective topics.

12. The computer program product of claim 8, further comprising:
- analyzing audio data of the real time data for content in order to classify a speech represented by the audio data into respective topics; and
- determining the speech having a topic relevant to a subject of the class as a positive activity and determining the speech having a topic irrelevant to the subject as a negative activity.

13. The computer program product of claim 8, further comprising:
- analyzing the real time data including audio data and movement data of the student in order to determine whether or not the student participates in the class, wherein participatory activities include raising a hand and asking questions; and
- discovering that the student does not participate in the class from the analyzing.

14. The computer program product of claim 13, the generating comprising:
- rendering a recommendation to participate in the class by performing one or more of the participatory activities, responsive to determining that the predicted performance is below the preconfigured threshold for the class, wherein the one or more recommendation from the generating includes the recommendation.

15. A system comprising:
a memory;
one or more processor in communication with the memory; and
program instructions executable by the one or more processor via the memory to perform a method for providing cognitive education advisory services, comprising:
- obtaining real time data including individual data from an individual device on person of a student attending a class, by an individual data collection agent running on the individual device, wherein the individual data collection agent communicates with a cognitive education advisor in real time, and wherein the individual device corresponding to the student is registered for the student in a student record for the student;
- identifying one or more activity of the student during the class from the real time data, based on a configuration for the cognitive education advisor specifying the one or more activities;
- correlating each of the one or more activity from the identifying with respective impact to performance of the student based on a performance record of the student record for the student, based on the configuration;
- calculating respective activity impact scores corresponding to the respective impacts, by use of predictive modeling on attributes of each of the one or more activity to the performance of the student;
- predicting the performance of the student in the class based on a collective activity impact score of the student in the class by adding up the respective activity impact scores from the calculating;
- generating one or more recommendation in order to improve the performance of the student, responsive to determining that predicted performance from the predicting is below a preconfigured threshold for the class; and
- communicating the one or more recommendation to a group of recipients specified for the student, wherein the method comprises analyzing geolocation data of the individual data in order to classify a seating position of the student in a classroom, wherein the seating position may be instantiated with a value selected from the group consisting of Front and Back, indicating respective areas within the classroom; and determining the seating position having a Front value as a positive activity and determining the seating position having a Back value as a negative activity, wherein the method comprises comparing the seating position of the student in comparison with a second seating position of a second student in proximity of the student; and discovering that an activity impact score for a peer influence attribute of the second student is less than zero (0), wherein a value of the peer influence attribute is selected from the group consisting of one, zero, negative one (1, 0, −1), wherein one (1) indicates that the second student is helpful to nearby students and attentive, zero (0) indicates that the second student is neutral, and negative one (−1) indicates that the second student is disruptive to the class.

16. The system of claim 15, the generating comprising:
rendering a recommendation not to take a seat near the second student, responsive to determining that the predicted performance is below the preconfigured threshold for the class, wherein the one or more recommendation from the generating includes the recommendation.

17. The system of claim 15, the generating comprising:
rendering a recommendation not to take a seat near the second student.

18. The system of claim 15, further comprising:
analyzing audio data of the real time data for content in order to classify a speech represented by the audio data into respective topics; and
determining the speech having a topic relevant to a subject of the class as a positive activity and determining the speech having a topic irrelevant to the subject as a negative activity.

19. The system of claim 15, further comprising:
analyzing the real time data including audio data and movement data of the student in order to determine whether or not the student participates in the class, wherein participatory activities include raising a hand and asking questions; and
discovering that the student does not participate in the class from the analyzing.

20. The system of claim 19, the generating comprising:
rendering a recommendation to participate in the class by performing one or more of the participatory activities, responsive to determining that the predicted performance is below the preconfigured threshold for the class, wherein the one or more recommendation from the generating includes the recommendation.

* * * * *